United States Patent [19]

Hino et al.

[11] Patent Number: 4,794,506
[45] Date of Patent: Dec. 27, 1988

[54] RESONANT DC-DC CONVERTER

[75] Inventors: Hirofumi Hino, Noda; Takanobu Hatakeyama, Ryugasaki, both of Japan

[73] Assignee: Hitachi Medical Corporation, Tokyo, Japan

[21] Appl. No.: 23,239

[22] Filed: Mar. 9, 1987

[30] Foreign Application Priority Data

Jan. 30, 1987 [JP] Japan .................................. 62-18209

[51] Int. Cl.$^4$ ............................................ H02M 3/335
[52] U.S. Cl. ........................................ 363/25; 363/17; 363/98; 363/132; 378/112
[58] Field of Search .................... 363/9, 17, 25, 97, 98, 363/132, 134; 323/241; 378/104, 111, 112

[56] References Cited

U.S. PATENT DOCUMENTS

| | | | |
|---|---|---|---|
| 4,347,562 | 8/1982 | Galloway | 323/241 |
| 4,504,895 | 3/1985 | Steigerwald | 363/17 |
| 4,672,528 | 6/1987 | Park et al. | 363/17 |

*Primary Examiner*—Patrick R. Salce
*Assistant Examiner*—Judson H. Jones
*Attorney, Agent, or Firm*—Antonelli, Terry & Wands

[57] ABSTRACT

Disclosed is a resonant DC-DC converter which comprises an inverter for converting DC power into AC power, a rectifier connected to the AC output of the inverter through a resonant transformer for rectifying AC output power of the transformer to obtain DC power to be applied to a load, means for determining respective operation phases of a first, a second, a third and a fourth switching elements constituting the inverter in accordance with set signals indicating a voltage and a current to be supplied to the load, and a phase control circuit for controlling the respective operation phases of the first, second, third and fourth switching elements on the basis of an output signal of the phase determining means in a manner so that the first and second switching elements are alternately turned on with a phase difference of 180 degrees with respect to an operation frequency of the inverter, the third and fourth switching elements are alternately turned on with a phase difference of 180 degrees with respect to the operation frequency of the inverter, while varying a phase difference from turn-on of the first switching element to turn-on of the fourth switching element and a phase difference from turn-on of the second switching element to turn-on of the third switching element to thereby control or feed-back control the DC power to be supplied to the load.

10 Claims, 10 Drawing Sheets

RESONANT DC-DC CONVERTER

BACKGROUND OF THE INVENTION

The present invention generally relates to a resonant DC-DC converter and particularly to a resonance DC-DC converter in which AC power is applied to a resonant transformer from a suitable AC power source and an AC output power of the transformer is rectified is supplied to a given load.

Such a resonant DC-DC converter is disclosed, for example, in U.S. Pat. No. 4,504,895. FIG. 8 is a diagram showing the resonant DC-DC converter disclosed in U.S. Pat. No. 4,504,895 but somewhat summarized for the sake of explanation. In FIG. 8, the DC-DC converter comprises: a DC power source 1; an inverter 2 for receiving DC power from the DC source and for converting the DC power into AC power, the inverter having a first series connection of first and second transistors $Tr_1$ and $Tr_2$ respectively acting as a first and a second switching element respectively connected to a positive and a negative pole of the DC power source 1, a second series connection connected in parallel to the first series connection and composed of third and fourth transistors $Tr_3$ and $Tr_4$ respectively acting as third and fourth switching elements disposed so as to respectively correspond to the first and second transistors, and first, second, third and fourth diodes $D_1$–$D_4$ anti-parallelly connected to the first, second, third and fourth transistors $Tr_1$–$Tr_4$ respetively; a transformer 3 connected to an output of the inverter for boosting an output voltage of the inverter; a rectifier 4 for converting an AC output voltage of the transformer into a DC output voltage; electrostatic capacitance C for smoothing an output voltage from the rectifier 4, and a load 5 connected to an output of the rectifier 4. The transistors $Tr_1$–$Tr_4$ are arranged to be driven by a frequency determination circuit 6 and a frequency control circuit 7 through driving circuits 8a to 8d, respectively.

The transformer 3 is used to isolate the input and output of the converter from each other, and used to boost or reduce the output voltage in the case where the input voltage is different from the output voltage. Particularly, in the case where a high voltage of several tens KV to 200 KV is generated, for example, in a power source for generating X-rays, the turn ratio of the transformer 3 is very large and hence the number of turns of the secondary winding is very large. Accordingly, the secondary windings are formed in layers which are stacked one on one while being insulated one from one with insulators such as insulating sheets interposed between adjacent layers. As a result, stray capacitances $C_{S1}$–$C_{Sn}$ are formed between the layers of the secondary windings in the transformer 3 as shown in FIG. 9A. The circuit of FIG. 9A can be expressed by such an equivalent circuit as shown in FIG. 9B. That is, the serial capacitances $C_{S1}$–$C_{Sn}$ form a stray capacitance $C_S$ of the secondary winding. Further, the transformer 3 per se may be expressed by leakage inductance $L_1$ and $L_2$ and excitation inductance $L_{ex}$ and therefore the whole of the transformer 3 may be expressed by those inductance $L_1$, $L_2$ and $L_{ex}$ together with the stray capacitance $C_S$ as shown in FIG. 9C. Further, generally, $L_1 << L_{ex}$ and $L_2 << L_{ex}$, so that leakage inductance $L_S$ being parasitic on the transformer 3 is expressed by $L_S = L_1 + L_2$ and the equivalent ciruict of the transformer 3 can be shown as FIG. 9D.

If such a transformer 3 is used, the leakage inductance $L_S$ being parastic on the transformer and the stray capacitance $C_S$ of the secondary winding can be used as resonance elements so that a voltage induced at the stray capacitance $C_S$ by the resonance between the leakage inductance $L_S$ and the stray capacitance $C_S$ and the transformation ratio of the transformer 3 is supplied to the rectifier 4 and the output voltage of the rectifier 4 is applied to the load 5 after being smoothed through the electrostatic capacitance C. In order to control the output power to be supplied to the load 5, the ratio $F_i/F_o$ of the operation fequency $F_i$ to the resonance frequency $F_o$ determined by the leakage inductance $L_S$ and the stray capacitacne $C_S$ is varied by the frequency determination circuit 6 and the frequency control circuit 8 shown in FIG. 8. That is, in the graph of FIG. 10, the respective curve shows the relation between the ratio $F_i/F_o$ and the output voltage $V_o$ of the transformer 3 with the ordinate and abscissa representing the input voltage from the DC power source 1 and the output voltage $V_o$ and with load resistance $R_1, R_2, \ldots, R_5$ ($R_1 > R_2 > \ldots > R_5$) as parameters. Since the resonance frequency takes a constant value determined by the leakage inductance $L_S$ and the stray capacitance $C_S$ of the transformer 3, the output voltage $V_o$ is controlled by suitably varying the operation frequency $F_i$ of the inverter 2.

In the thus arranged conventional resonant DC-DC converter, as seen in FIG. 10, the output voltage $V_o$ becomes maximum when the value of the ratio $F_i/F_o$ is about "1", and if the operation frequency $F_i$ of the inverter 2 is made lower or higher than the resonance frequency $F_o$, the output voltage $V_o$ is reduced. However, the output voltage $V_o$ cannot be reduced to zero. In this case, the output voltage $V_o$ can be made to approach zero if the operation frequency $F_i$ of the inverter 2 is made extremely low or extremely large. If the operation frequency $F_i$ is made lower, however, the time quadrature of the voltage applied to the transformer 3 becomes larger and therefore it is necessary to make the sectional area of the core of the transformer 3 larger, resulting in increase in size of the transformer 3. Further, there is a limit in making the size of the transformer 3 and the operation frequency $F_i$ cannot be made so low to thereby cause a limit in the output voltage control range. Further, even if the operation frequency $F_i$ of the inverter 2 is made higher than an audio frequency so as to make noises low, the operation frequency $F_i$ may reach the audio frequency range to allow noises to become high when the operation frequency $F_i$ is made low in order to make the output voltage low in the case of a light load. Also in this case, accordingly, the operation frequency $F_i$ cannot be made so low to thereby cause a limit in the output voltage control range.

SUMMARY OF THE INVENTION

It is therefore an objcct of the present invention to eliminate the drawback in the prior art.

It is another object of the present invention to provide a resonant DC-DC converter in which a control range of an output power can be extended without changing the operation frequency of the inverter and in which the converter can be reduced in size.

In order to attain the above objects, according to the present invention, an improvement is made in a resonant DC-DC converter comprising: a DC power source; an inverter for receiving DC power from the DC source and for converting the DC power into AC power, the inverter having a first series connection of a first and a second switching element respectively connected to a positive and a negative pole of the DC power source 4, a second series connection connected in parallel to the first series connection and composed of third and fourth transistors Tr3 and Tr4 respectively acting as a third and a fourth switching element disposed so as to respectively correspond to the first and second transistors, and first, second, third and fourth diodes antiparallelly connected to the first, second, third and fourth switching elements, respectively; a transformer connected to an output of the invetter for boosting an output voltage of the inverter; a rectifier for converting an AC output voltage of the transformer into a DC output voltage; and a load connected to the rectifier; the transformer having a parasitic leakage inductance and a stray capacitance existing among primary or secondary windings of the transformer; in which the leakage inductance and the stray capacitance are used as resonance elements so that a resonance voltage induced at the stray capacitance by resonance between the leakage inductance and the stray capacitance and a transformation ratio is applied to the rectifier, and the DC output voltage of the rectifier is smoothed and applied to the load.

In an aspect of the invention, the DC-DC converter is further provided with: a phase determination circuit for deteriining respective operation phases of the first, second, third and fourth switching elements of the inverter in accordance with set signals indicating a voltage and a current to be supplied to the load; and a phase control circuit for controlling the respective operation phases of the first, second, third and fourth switching elements on the basis of an output signal of the phase determination circuit in a mnnner so that the first and second switching elements are alternately turned on with a phase difference of 180 degrees with respect to an operation frequency of the inverter, the third and fourth switching elements are alternately turned on with a phase difference of 180 degrees with respect to the operation frequency of the inverter, while varying a phase difference from a point in time of turn-on of the first switching element to a point in time of turn-on of the fourth switching element and a phase difference from a point in time of turn-on of the second switching element to a point in time of turn-on of the third switching element to thereby control the power supplied to the load.

In another aspect of the invention, the DC-DC converter is further provided with: a voltage divider for detectigg the voltage applied to the load; an error amplification phase determination circuit for receiving a detection signal from the voltage divider and an externally applied preset target voltage signal so as to amplify a difference between the detection signal and the target voltage signal, and for determining respective operation phases of the first, second, third and fourth switching elements of the inverter, on the basis of the amplified difference; a phase control circuit for controlling the respective operation phases of the first, second, third and fourth switching elements on the basis of an output signal of the error amplification phase determination circuit in a manner so that the first and second switching elements are alternately turned on with a phase difference of 180 degrees with respect to an operation frequency of the inverter, the third and fourth switching elements are alternately turned on with a phase difference of 180 degrees with respect to the operation frequency of the inverter, while varying a phase difference from a point in time of turn-on of the first switching element to a point in time of turn-on of the fourth switching element and a phase difference from a point in time of turn-on of the second switching element to a point in time of turn-on of the third switching element to thereby effect feedback-control of the power supplied to the load.

The above and other objects and features of the invention will appear more fully hereinafter from a consideration of the following description taken in connection with the accompanying drawings.

DESCRIPTION OF THE PREFERRED EMBODIMENTS

Embodiments of the resonant DC-DC converter according to the present invention will be described in detail with reference to the accompanying drawings hereunder.

Figure 1:
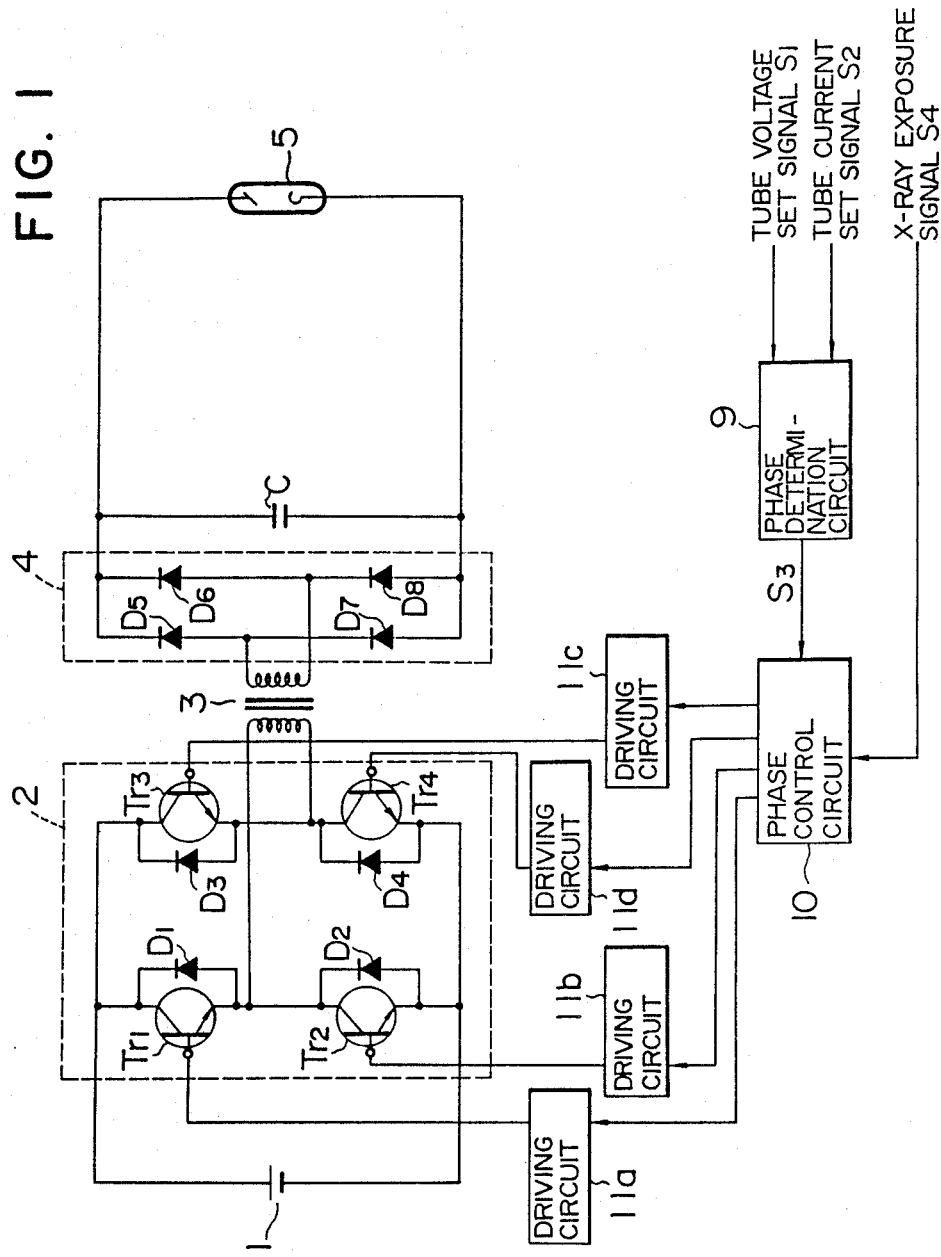
FIG. 1 is a circuit diagram of an embodiment of the resonance DC-DC converter according to a first aspect of the invention.

FIG. 1 is a circuit diagram showing an embodiment of the resonant DC-DC converter according to a first aspect of the invention. This resonant DC-DC converter is provided with DC power source 1 such as a secondary battery or the like, an inverter 2, a transformer 3, a rectifier 4, and a load 5.

The inverter 2 is arranged to receive DC power from the DC power source 1 so as to convert the DC power into AC power. The inverter 2 is constituted by: a first series connection including a first transistor Tr1 acting as a first switching element and being connected at its collector to a positive pole of the DC power source 1 and a second transistor Tr2 acting a second switching element and being connected at its emitter to a negative pole of the DC power source 1; a second series connection connected in parallel to the first series connection and composed of a third transistor Tr3 acting as a third switching element and being disposed so as to correspond to the first transistor Tr$_1$ and a fourth transistor Tr$_4$ acting as a fourth switching element and being disposed so as to correspond to the second transistor Tr$_2$; and first, second, third, and fourth diodes D$_1$–D$_4$ anti-parallelly connected to the first through fourth transistors Tr$_1$–Tr$_4$, respect. Each of the transistors Tr$_1$ through Tr$_4$ is arranged to be turned on when supplied with a base current.

Figure 9A:
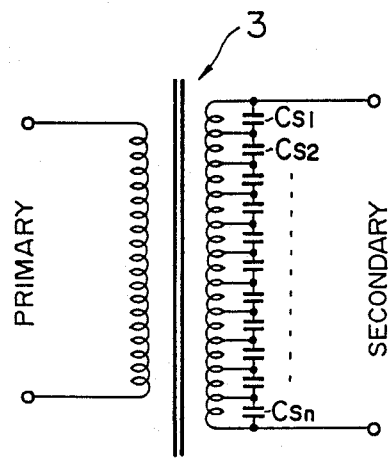
FIGS. 9A–9D are diagrams showing various equivalent circuits of the transformer used in the conventional resonant DC-DC converter of FIG. 8.
Figure 9B:
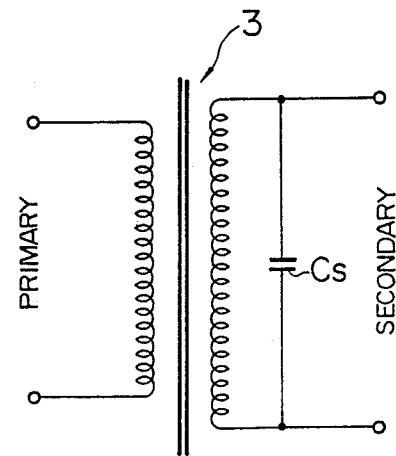
Figure 9C:
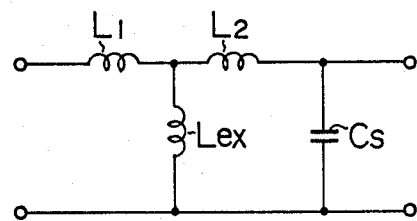
Figure 9D:
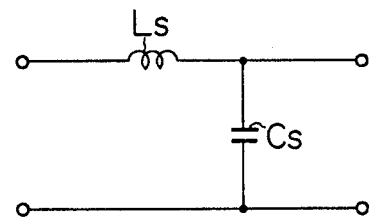
Figure 10:
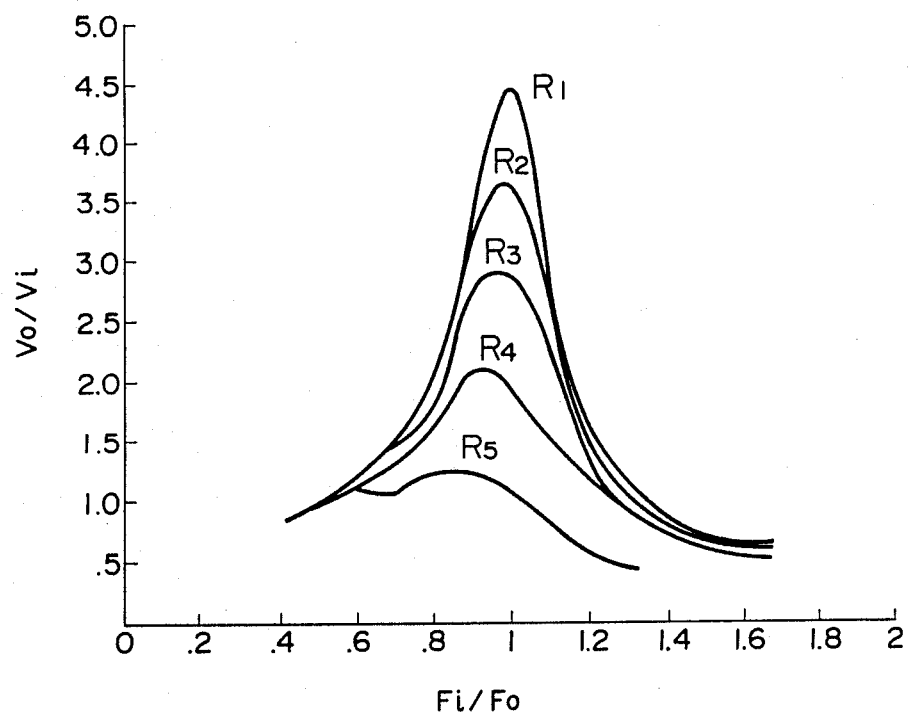
FIG. 10 is a graph for explaining control of the output voltage in the conventional resonant DC-DC converter of FIG. 8.

The transformer 3 is connected to the output of the inverter 2 so as to boost an output voltage of the inverter 2. The transformer 3 has a predetermined turns ratio between the primary and secondary windings and has a leakage inductance L$_S$ and a stray capacitance C$_S$ which are the same as shown in FIG. 9D.

The rectifier 4 is constituted by four diodes D$_5$ through D$_8$ and arranged to convert an output voltage of the transformer 3 into a DC output voltage through full-wave rectification. The output of the rectifier 4 is connected to the load 5, for example, an X-ray tube or the like. An electrostatic capacitance C of a high tension cable for applying an output voltage of the rectifier 4 to the load 5 such as an X-ray tube or the like serves to smooth the output voltage of the rectifier 4.

In this embodiment according to the first aspect of the invention, there are further provided: a phase determination circuit 9 for determining respective operation phases of the transistors Tr$_1$ through Tr$_4$ of the inverter 2 in accordance with set signals instructing a voltage and a current to be supplied to the load 5 such as an X-ray tube (hereinafter, referred to as a tube voltage and a tube current respectively); a phase control circuit 10 for generating control signals for controlling respective operation phases of the transistors Tr$_1$ through Tr$_4$ on the basis of an output signal of the phase determination circuit 9 and for sending out the control signals in response to an X ray exposure signal applied from a controller (not shown); and driving circuits 11a through 11d for driving the transistors Tr$_1$ through Tr$_4$ respectively on the basis of the control signals sent-out from the phase control circuit 10. Power to be supplied to the X-ray tube acting as the load 5 is controlled by the phase determination circuit 9 and the phase control circuit 10 in such a manner that the respective transistors Tr$_1$ and Tr$_2$ acting as the first and second switching elements of the inverter 2 are alternately turned on with a phase difference of 180 degrees with respect to an operation frequency of the inverter 2, and the respective transistors Tr$_3$ and Tr$_4$ acting as the third and fourth switching elements are alternately turned on with a phase difference of 180 degrees similarly to the transistors Tr$_1$ and Tr$_2$, while properly varying a phase difference from a point in time of turn-on of the first transistor Tr$_1$ to a point in time of turn-on of the fourth transistor Tr$_4$ and a phase difference from a point in time of turn-on of the second transistor Tr$_2$ to a point in time of turn-on of the third transistor Tr$_3$.

Next, description will be made as to the operation of the thus arranged resonant DC-DC converter. First, a main circuit portion constituted by the DC power source 1, the inverter 2, the transformer 3, the rectifier 4, and the load 5 in the resonant DC-DC converter of FIG. 1 can be expressed by an equivalent circuit shown in FIG. 2. That is, the transistors Tr$_1$, Tr$_2$, Tr$_3$, and Tr$_4$ constituting the inverter 2 are shown by the first, the second, the third, and the fourth switching element 12a, 12b, 12c, and 12d respectively, and the transformer 3 is shown by the leakage inductance L$_S$ and the stray capacity C$_S$ similarly to FIGS. 9A–9D. The first switching lement 12a and the diode D$_1$ anti-parallelly connected to the former constitute a first arm 13a. Similarly to this, the second switching element 12b and the diode D$_2$ constitute a second arm 13b, the third switching element 12c and the diode D$_3$ constitute a third arm 13c, and the fourth switching element 12d and the diode D$_4$ constitute a fourth arm 13c.

Then, referring to timing diagrams of FIGS. 3 and 4, description will be made as to the operation of the main circuit portion by using the equivalent circuit of FIG. 2.

First, referring to FIG. 3, description will be made as to the operation in the case where control is performed so as to maximize the output power of the inverter 2. At this time, the operation phases of the switching elements 12a through 12d are controlled in such a manner that the first and second switching elements 12a and 12b are alternately turned on with a phase difference of 180 degrees, the fourth and third switching elements 12d and 12c are alternately turned on with a phase difference of 180 degrees, the first and fourth switching elements 12a and 12d are turned on with a phase difference of zero, that is, turned on simultaneously with each other, and the second and third switching elements 12b and 12c are turned on with a phase difference of zero, that is, turned on simultaneously with each other, as shown in the diagrams (a) through (d) of FIG. 3.

Figure 3:
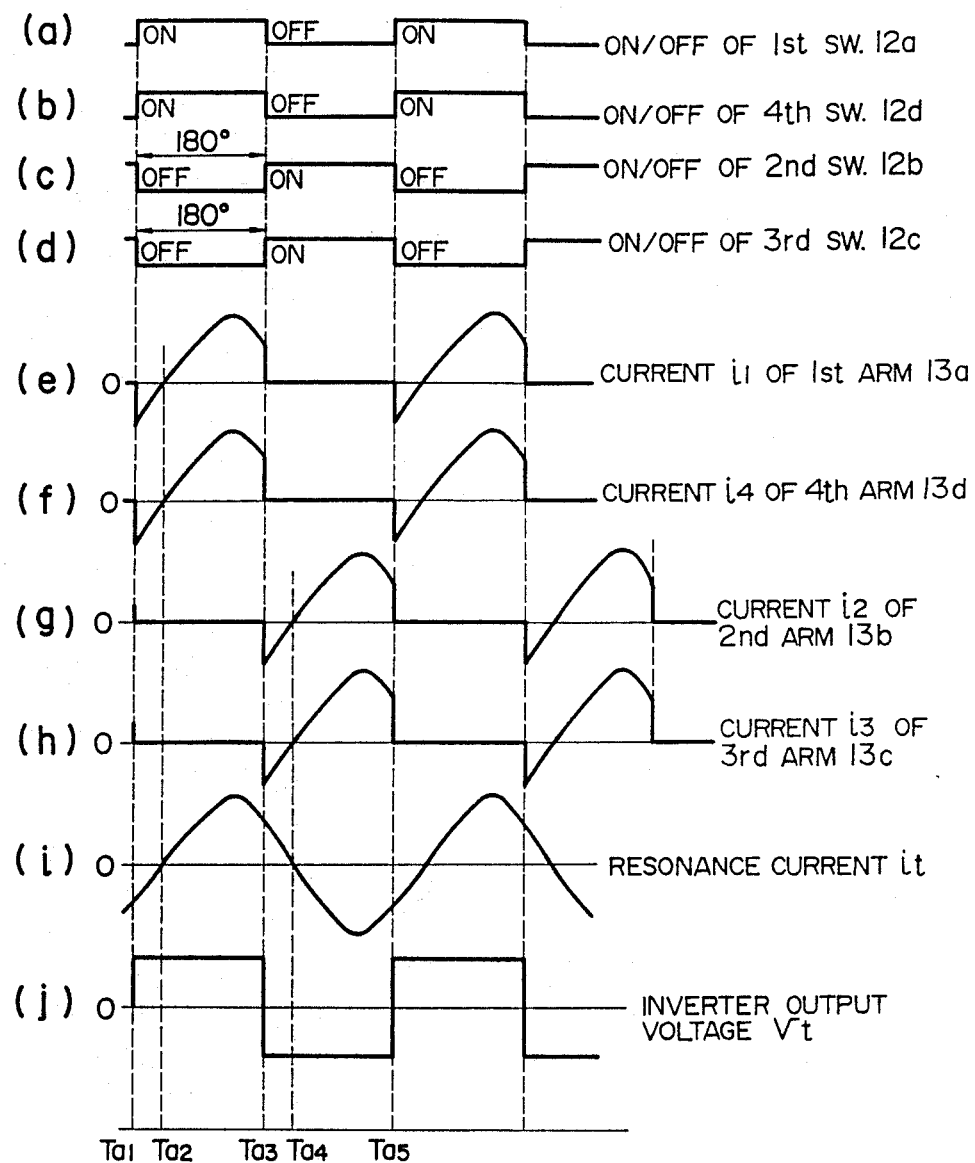
FIG. 3 is a time chart for explaining the operation in the case where control is made so as to make the output power maximum.

First, at a point in time Ta$_1$ in FIG. 3, a resonance current i$_t$ is being caused to flow by energy of the leakage inductance L$_S$ through each of a circuit of the leakage inductance L$_S$→ the diode D$_1$→ the DC power source 1→ the diode D$_4$→ the stray capacity C$_S$→ the leakage inductance L$_S$, another circuit of the leakage inductance L$_S$→ the diode D$_1$→ the DC power source 1→ the diode D$_4$→ the rectifier 4→ the electrostatic capacity C→ the rectifier 4→ the leakage inductance L$_S$, a further circuit of the leakage inductance L$_S$→ the diode D$_1$→ the DC power source 1→ the diode D$_4$→ the rectifier 4→ the load 5→ the rectifier 4→ the leakage inductance L$_S$. Hereinafter, the state where the resonance current i$_t$ flows through the three divisional paths after the fourth diode D$_4$ is similarly expressed by D$_4$→ (C$_S$, 4, C, and 5)→L$_S$. As a result, negative currents i$_1$ and i$_4$ flow in the first and fourth arms 13a and 13d respectively (the diagrams (e) and (f) of FIG. 3). At this time, the first and fourth switching elements 12a and 12d are turned on, resulting in no influence on the circuits through which the currents i$_1$ and i$_4$ flow. Thereafter, the resonance current i$_t$ approaches zero as shown in the diagram (i) of FIG. 3 as the energy of the leakage inductance L$_S$ decreases.

Figure 2:
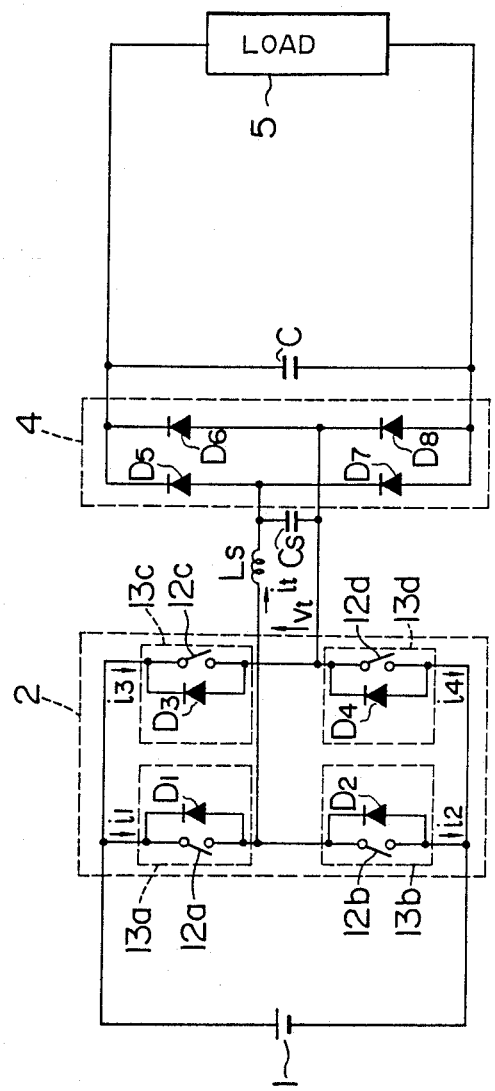
FIG. 2 is an equivalent circuit showing the main circuit portion in the resonance DC-DC converter shown in FIG. 1.

Next, after the resonance current i$_t$ becomes zero at a point in time Ta$_2$ as shown in the diagram (i) of FIG. 3, the resonance current i$_t$ flows through a circuit of the DC power source 1→ the switching element 12a→ the leakage inductance L$_S$→ the stray capacitance C$_S$→ the switching element 12d→ the DC power sou in FIG. 2 while increasing along an arcuate curve of a resonance frequency determined by the leakage inductance L$_S$ and the stray capacitance C$_S$. Thereafter, when a voltage across the stray capacitance C$_S$ becomes equal to that across the electrostatic capacitance C, the resonance current i$_t$ flows through a circuit of the DC power source 1→ the switching element 12a→ the leakage element L$_S$→(CS, 4, C, and 5)→ the switching element 12d→ the DC power source 1.

At a point in time Ta$_3$, the first and the fourth switching elements 12a and 12d are turned off, and the second and the third switching elements 12b and 12c are turned on, as shown in the diagrams (a) through (d) of FIG. 3. The resonance current $i_t$, however, is caused to flow by the energy of the leakage inductance $L_S$ through a circuit of the leakage inductance $L_S \rightarrow (C_S, 4, C,)$ and $5) \rightarrow$ the diode $D_3 \rightarrow$ the DC power source $1 \rightarrow$ the diode $D_2 \rightarrow$ the leakage inductance $L_S$, in FIG. 2. Therefore, negative currents $i_2$ and $i_3$ flow in the second and third arms $13b$ and $13c$ respectively (the diagrams (g) and (h) of FIG. 3). Thereafter, the resonance current $i_t$ approaches zero as shown in the diagram (i) of FIG. 3 as the energy of the leakage inductance $L_S$ decreases.

The resonance current $i_t$ becomes zero at a point in time $T_{a4}$ as shown in the diagram (i) of FIG. 3. Then, the resonance current $i_t$ flows through a circuit of the DC power source $1 \rightarrow$ the switching element $12c \rightarrow$ the stray capacitance $C_S \rightarrow$ the leakage inductance $L_S \rightarrow$ the switching element $12b \rightarrow$ the DC power source 1 in FIG. 2 so that the amplitude of the resonance current $i_t$ negatively increases along the arcuate curve of the resonance frequency determined by the leakage inductance $L_S$ and the stray capacitance $C_S$. When the voltage across the stray capacitance $C_S$ becomes equal to that across the electrostatic capacitance $C$, the resonance current $i_t$ flows through a circuit of the DC power source $1 \rightarrow$ the switching element $12c \rightarrow (C_S, 4, C,$ and $5) \rightarrow$ the leakage inductance $L_S \rightarrow 12b \rightarrow$ the DC power source 1.

At a point in time $T_{a5}$, the second and third switching elements $12b$ and $12c$ are turned off, and the first and fourth switching elements $12a$ and $12d$ are turned on, as shown in the diagrams (a) through (d) of FIG. 3. As a result, the switching elements $12a$ through $12d$ become in the same state as that at the point in time $T_{a1}$, and thereafter the foregoing operation is repeated.

In the case where the operation phase of the inverter 2 is controlled as described above, the first and fourth switching elements $12a$ and $12d$ are turned on/off with a phase difference of zero, that is, simultaneously turned on/off, and the second and third switching elements $12b$ and $12c$ are turned on/off with a phase difference of zero, that is, simultaneously turned on/off. Therefore, the current $i_1$ flowing in the first arm $13a$ has the same waveform as that of the current $i_4$ flowing in the fourth arm $13d$ as shown in the diagrams (e) and (f) of FIG. 3, and the current $i_2$ flowing in the second arm $13b$ has the same waveform as that of the current $i_3$ flowing in the third arm $13c$ as shown in the diagrams (g) add (h) of FIG. 3. The period in which both the first and fourth switching elements $12a$ and $12d$ are in the on-state (from the point in time $T_{a1}$ to the point in time $T_{a3}$) is continued in the following period in which both the second and third switching elements $12b$ and $12c$ are in the on-state (from the point in time $T_{a3}$ to the point in time $T_{a5}$), so that the output voltage $V_t$ of the inverter 2 has a continuous square waveform having a positive and a negative crest value equal to the output voltage of the DC power source 1 as shown in the diagram (j) of FIG. 3 and the output power of the inverter 2 becomes maximum.

Next, referring to FIG. 4, description will be made as to the operation in the case where control is performed so as to reduce the output power of the inverter 2. In this case, the respective operation phases of the switching elements $12a$ through $12d$ of the inverter 2 of FIG. 2 are controlled in such a manner that the first and second switching elements $12a$ and $12b$ are alternately turned on with a phase difference of 180 degrees, the fourth and third switching elements $12d$ and $12c$ are alternately turned on with a phase difference of 180 degrees, the first and fourth switching elements $12a$ and $12d$ are turned on with a time lag, that is, a phase difference $\alpha$ from the turn-on of the former to the turn-on of the latter, and the second and third switching elements $12b$ and $12c$ are turned on with a time lag, that is, a phase difference from the turn-on of the former to the turn-on of the latter, as shown in the diagrams (a) through (d) of FIG. 4.

Figure 4:
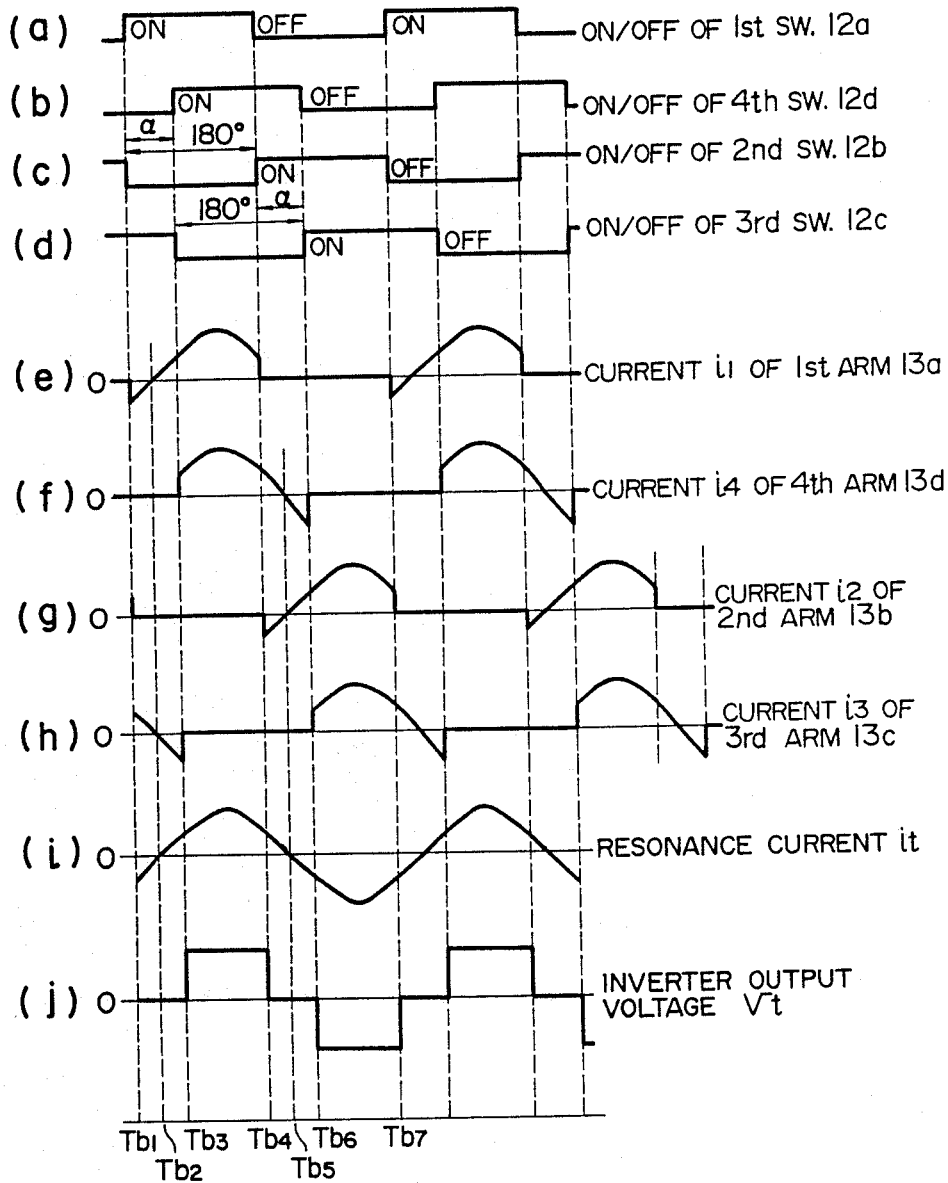
FIG. 4 is a time chart for explaining the operation in the case where control is made so as to reduce the output power.

First, at a point in time $T_{b1}$ of FIG. 4, the first and the third switching elements $12a$ and $12c$ are in the on-state in FIG. 2, so that the resonance current $i_t$ is caused to flow by the energy of the leakage inductance $L_S$ through a circuit of the leakage inductance $L_S \rightarrow$ the diode $D_1 \rightarrow$ the switching element $12c \rightarrow ((C_S, 4, C,$ and $5) \rightarrow$ the leakage inductance $L_S$. Therefore, the negative current $i_1$ flows in the first arm $13a$ as shown in the diagram (e) of FIG. 4 while the positive current $i_3$ flows in the third arm $13c$ as shown in the diagram (h) of FIG. 4. Thereafter, the resonance current $i_t$ approaches zero as shown in the diagram (i) of FIG. 4 as the energy of the leakage inductance $L_S$ decreases.

The resonance current $i_t$ becomes zero at a timing $T_{b2}$, and then the resonance current $i_t$ is caused to flow by energy of the stray capacitance $C_S$ through a circuit of the stray capacitance $C_S \rightarrow$ the diode $D_3 \rightarrow$ the switching element $12d \rightarrow$ the leakage inductance $L_S \rightarrow S$ the stray capacitance $C_S$, while increasing along an arcuate curve of a resonance frequency determined by the leakage inductance $L_S$ and the stray capacitance $C_S$, as shown in the diagram (i) of FIG. 4. At this time, the positive current $i_1$ begins to flow in the first arm $13a$ as shown in the diagram (e) of FIG. 4 while the negative current $i_3$ begins to flow in the third arm $13c$ as shown in the diagram (h) of FIG. 4.

The third switching element $12c$ is turned off at a point in time $T_{b3}$ as shown in the diagram (d) of FIG. 4, an at the same time the fourth switching element $12d$ is turned on as shown in the diagram (b) of FIG. 4. As a result, both the first and fourth switching elements $12a$ and $12d$ are in the on-state as shown in the diagrams (a) and (b) of FIG. 4, and the diode $D_3$ is reversely biased to be turned off in response to the turn-on of the fourth switching element $12d$, so that the resonance current $i_t$ flows through a circuit of the DC power source $1 \rightarrow$ the switching element $12a \rightarrow$ the leakage inductance $L_S \rightarrow$ the stray capacitance $C_S \rightarrow$ the switching element $12_d \rightarrow$ the DC power source 1. Thereafter, when the voltage across the stray capacitance $C_S$ becomes equal to that across the electrostatic capacitance $C$, the resonance current $i_t$ flows through a circuit of the DC power source $1 \rightarrow$ the switching element $12a \rightarrow$ the leakage inductance $L_S \rightarrow (C_S, 4, C,$ and $5) \rightarrow$ the switching element $12d \rightarrow$ the DC power source 1. In this period, the current $i_1$ flowing in the first arm $131a$ has the same waveform as the current $i_4$ flowing in the fourth arm $13d$ as shown in the diagrams (e) and (f) of FIG. 4.

At a point in time $T_{b4}$, the first switching element $12a$ is turned off as shown in the diagram (a) of FIG. 4, and the second switching element $12b$ is turned on as shown in the diagram (c) of FIG. 4. At this time, the resonance current $i_t$ is caused to flow by the energy of the leakage inductance $L_S$ through a circuit of the leakage inductance $L_S \rightarrow (C_S, 4, C,$ and $5) \rightarrow$ the switching element $12d \rightarrow$ the diode $D_2 \rightarrow$ the leakage inductance $L_S$. Therefore, the negative current $i_2$ flows in the second arm $13b$ as shown in the diagram (g) of FIG. 4 while the positive current $i_4$ flows in the fourth arm $13d$ as shown in the diagram (f) of FIG. 4. Thereafter, the resonance current $i_t$ approaches zero as shown in the diagram (i) of FIG. 4 as the energy of the leakage inductance $L_S$ decreases.

The resonance current $i_t$ becomes zero at a point in time $Tb_4$, and then the resonance current $i_t$ flows through a circuit of the stray capacitance $C_S \rightarrow$ the leakage inductance $L_S \rightarrow$ the switching element $12b \rightarrow$ the diode $D_4 \rightarrow$ the stray capacitance $C_S \rightarrow$ in FIG. 2, while negatively increasing its amplitude an arcuate curve of the resonance frequency determined by the leakage inductance $L_S$ and the stray capacitance $C_S$, as shown in the diagram (i) of FIG. 4.

At a point in time $Tb_6$, the fourth switching element $12d$ is turned off as shown in the diagram (b) of FIG. 4, and the third switching element $12c$ is turned on as shown in the diagram (d) of FIG. 4. As a result, the second and third switching elements $12b$ and $12c$ are in the on-state as shown in the diagrams (c) and (d) of FIG. 4 respectively, so that the resonance current $i_t$ flows through a circuit of the DC power source $1 \rightarrow$ the switching element $12c \rightarrow$ the stray capacity $C_S \rightarrow$ the leakage inductance $L_S \rightarrow$ the switching element $12b \rightarrow$ the DC power source 1 in FIG. 2. Thereafter, when the voltage across the stray capacitance $C_S$ becomes equal to that across the electrostatic capacitance C, the resonance current $i_t$ flows through a circuit of the DC power source $1 \rightarrow$ the switching element $12c \rightarrow$ (CS, 4, C, and 5)$\rightarrow$ the leakage inductance $L_S \rightarrow$ the switching element $12b \rightarrow$ the DC power source 1. In this period, the current $i_2$ flowing in the second arm $13b$ has the same waveform as that of the current $i_3$ flowing in the third arm $13c$ as shown in the diagrams (g) and (h) of FIG. 4.

Then, at a point in time $Tb_7$, the second switching element $12b$ is turned off as shown in the diagram (c) of FIG. 4, and the first switching element $12a$ is turned on as shown in the diagram (a) of FIG. 4, so that the switching elements $12a$ through $12d$ are in the state quite the same as that at the point in time $Tb_1$, the foregoing operation being repeated thereafter.

In the case where the operation phase of the inverter 2 is controlled in such a manner as described above, the first and fourth switching elements $12a$ and $12d$ are turned on/off with a time lag or a phase difference $\alpha$, and the second and third switching elements $12b$ and $12c$ are turned on/off with a time lag or a phase difference $\alpha$. Therefore, a first simultaneous on-period in which both the first and fourth switching elements $12a$ and $12d$ are in the on-state (from the point in time $Tb_3$ to the point in time $Tb_4$) is shorter by $\alpha$ than a period in which each of the switching elements $12a$ and $12d$ is in the on-state, and a second simultaneous on-period in which the second and third switching elements $12b$ and $12c$ are in the on-state (from the point in time $Tb_6$ to the point in time $Tb_7$) is shorter by $\alpha$ than a period in which each of the switching elements $12b$ and $12c$ is in the on-state. Only in each of the above-mentioned discontinued or intermittent first and second simultaneous on-periods, DC power is applied from the DC power source 1 to the load 5. Therefore, the output voltage $V_t$ of the inverter 2 has an intermittent square waveform which has a positive and a negative crest value equal in absolute value to the output voltage of the DC power source 1 respectively in the foregoing discontinued or intermittent simultaneous on-periods (each 180-$\alpha$degrees), as shown in the diagram (j) of FIG. 4. Accordingly, the above-mentioned simultaneous on-periods can be changed so as to control the power supplied to the load by properly changing the phase difference $\alpha$ from turn on of the first switching element $12a$ to turn-on of the fourth switching element $12d$ and the phase difference from turn on of the second switching element $12b$ to turn-on of the third switching element $12c$ is suitably changed. That is, by increasing the respective phase difference $\alpha$, the output power can be gradually reduced to zero as the phase difference increases up to 180 degrees where there is no period in which both the switching elements $12a$ and $12d$ as well as both the switching elements $12b$ and $12c$ are in the on-state.

Figure 5:
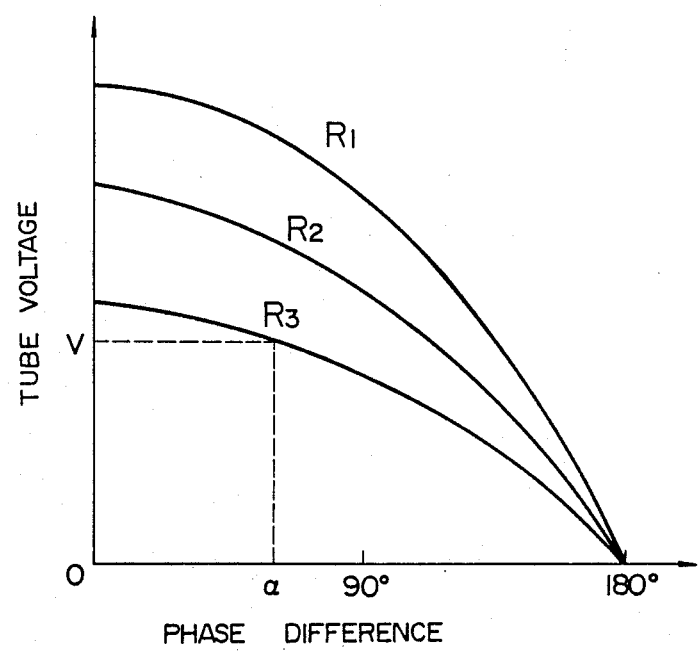
FIG. 5 is a graph showing relation between a phase difference and a tube voltage with load resistance values as parameter in the phase determination circuit.

The phase determination circuit 9 and the phase control circuit 10 of FIG. 1 which control the main circuit portion of FIG. 2 are controlled so as to operate the inverter in such a manner as described above. Now, description will be made as to the operations of the phase determination circuit 9 and the phase control circuit 10 for controlling the operation phases of the transistors $Tr_1$ through $Tr_4$ constituting the inverter 2 as shown in FIG. 1. First, when a tube voltage and a tube current to be supplied to the X-ray tube acting as the load 5 are determined, a tube voltage set signal $S_1$ and a tube current set signal $S_2$ corresponding to the tube voltage and the tube current, respectively, are applied from the controller (not shown) to the phase determination circuit 9. The phase determination circuit 9 is constituted by a memory storing tables representing a graph which expresses the relationship between the phase difference $\alpha$ and the tube voltage V of the X-ray tube acting as the load 5 by means of curves with the abscissa and the ordinate representing the phase difference and the tube voltage V respectively and with load resistance values $R_1, R_2, R_3 \ldots (R_1 > R_2 > R_3 \ldots)$ as parameters, for example, as shown in FIG. 5. Alternatively, the phase determination circuit 9 may be constituted by a function generator, an operational amplifier, or the like. In this phase determination circuit 9, the load resistance value $R_1, R_2, \ldots$, or the like, for example $R_3$, is obtained on the basis of the tube voltage set signal $S_1$ and the tube current set signal $S_2$, and then a point on the curve concerned with the obtained parameter, that is, the load resistance value $R_3$ is obtained corresponding to a tube voltage V to be set now to thereby determine the necessary phase difference $\alpha$ for operations of the transistors $Tr_1$ through $Tr_4$ of the inverter 2 corresponding to the obtained point on the curve, as shown by a dotted in FIG. 5. Then, a phase signal $S_3$ corresponding to the thus determined phase difference $\alpha$ is produced from the phase determination circuit 9, and applied to the phase control circuit 10. On the basis of the phase signals $S_3$, the phase control circuit 10 generates control signals for turnnng on/off the respective transistors $Tr_1$ through $Tr_4$, and a control signal for controlling the phase difference $\alpha$ from turn-on of the transistor $Tr_1$ acting as the first switching element to turn-on of the transistor $Tr_2$ acting as the fourth switching element as wel as the phase difference from turn-on of the transistor $Tr_2$ acting as the second switching element to turn-on of the transistor $Tr_3$ acting as the third switching element. Upon reception of the X-ray exposure signal $S_4$ applied from the controller (not shown), the phase control circuit 10 supplies the generated control signals to the driving circuits $11a$ through $11d$, so that the driving circuits $11a$ through $11d$ drive the respective transistors $Tr_1$ through $Tr_4$ constituting the inverter 2 on the basis of the control signals supplied from the phase control circuit 10.

When the transistors $Tr_1$ through $Tr_4$ are started to operate as described above, the resonance current $i_r$ as shown in FIG. 3 or 4 flows in the transformer 3, so that power in accordance with the set tube voltage and tube current is supplied to the X-ray tube acting as the load 5. At this time, the inverter 2 operates at a resonance frequency determined by the leakage inductance $L_S$ and the stray capacitance $C_S$ of the transformer 3 or a frequency near the resonance frequency.

Figure 6:
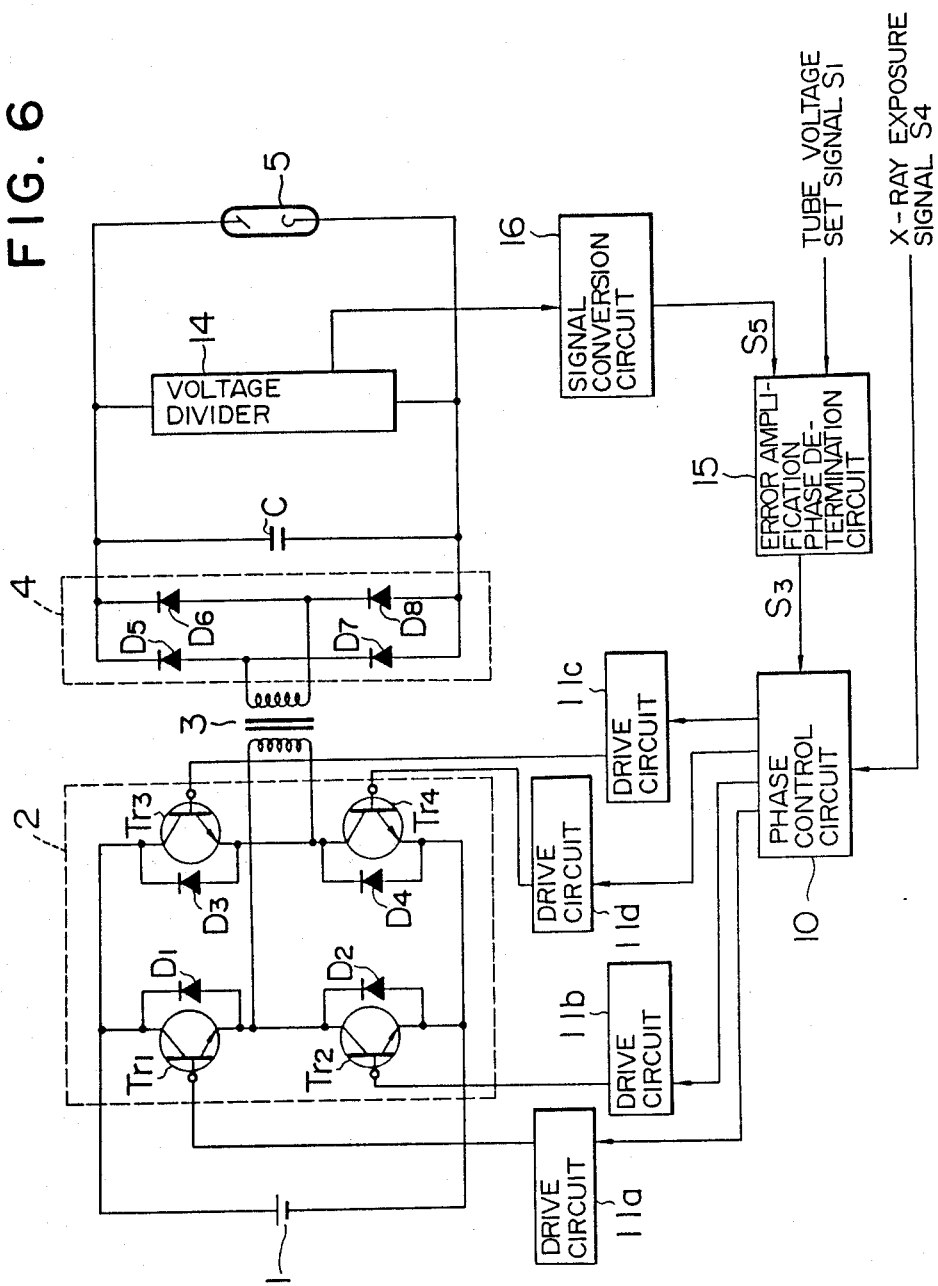
FIG. 6 is a circuit diagram of an embodiment of the resonance DC-DC converter according to a second aspect of the invention.

FIG. 6 is a circuit diagram showing an embodiment of the resonant DC-DC converter according to a second aspect of the present invention. In FIG. 6, for the sake of the simplification of explanation, parts having the same arrangement and function as those of the parts used in the embodiment of FIG. 1 according to the first aspect of the invention are correspondingly referenced, and the explanation of those parts is omitted. In this embodiment according to the second aspect of the invention, there are provided a voltage divider 14 for detecting a tube voltage appleed to a load 5 such as an X-ray tube or the like, an error amplification phase determination circuit 15, a phase control circuit 10, and a signal conversion circuit 16 for converting a signal representing the tube voltage detected by the voltage divider 14 into a tube voltage detection signal $S_5$ in the form suitable for use in the error amplification phase determination circuit 15. The error amplification phase determination circuit 15 is arranged to receive the detection signal from the signal converter circuit 16 and a preset target voltage signal (a tube voltage set signal $S_1$) and amplify a difference between the detection signal and the target voltage signal to thereby determine operation phases of transistors $Tr_1$ through $Tr_4$ constituting an inverter 2 on the basis of the amplified difference. The phase control circuit 10 is arranged to generate control signals for controlling the operation phases of the respective transistors $Tr_1$ through $Tr_4$ on the basis of an output signal from the error amplification phase determination circuit 15 and send out the control signal in response to an X-ray exposure signal $S_4$ applied from a controller (not shown). Power to be supplied to the X-ray tube acting as the load 5 is feed-back controlled through the voltage divider 14, the signal conversion circuit 16, the error amplification phase determination circuit 15, and the phase control circuit 10 in such a manner that the transistors $Tr_1$ and $Tr_2$ acting as a first and a second switching element of the inverter 2 respectively are alternately turned on with a phase difference of 180 degrees with respect to an operation frequency of the inverter 2, the transistors $Tr_3$ and $Tr_4$ acting as a third and a fourth switching elements of the inverter respectively are alternately turned on with a phase difference of 180 degrees similarly to the transistors $Tr_1$ and $Tr_2$, while properly varying a phase difference from a point in time of turn-on of the first transistor $Tr_1$ to a point in time of turn-on of the fourth transistor $Tr_4$ and a phase difference from a point in time of turn-on of the second transistor $Tr_2$ to a point in time of turn-on of the third transistor $Tr_3$.

Next, description will be made as to the operation of the thus arranged resonant DC-DC converter according to the second aspect of the invention. First, when a tube voltage to be supplied to the X-ray tube acting as the load 5 is determined, the error amplification phase determination circuit 15 is supplied with the tube voltage set signal $S_1$ corresponding to the determied tube voltage from the controller (not shown). The error amplification phase determination circuit 15 is further supplied with the above-mentioned tube voltage detection signal $S_5$ from the signal conversion circuit 16. In the error amplification phase determination circuit 15, an error between the tube voltage set signal $S_1$ and the tube voltage detection signal $S_5$ is detected, and the thus detected error is processed through proportional-plus-integral control or the like to thereby determine a difference $\alpha$ in operation phase between the transistors $Tr_1$ through $Tr_4$ constituting the inverter 2 in accordance with the above-mentioned error. Then, a phase signal $S_3$ corresponding to the thus determined phase difference $\alpha$ is produced from the error amplification phase determination circuit 15, and applied to the phaee control circuit 10. At this time, the error between the tube voltage set signal $S_1$ and the tube voltage detection signal $S_5$ is zero prior to the initiation of the X-ray exposure, and therefore the phase difference $\alpha$ is selected to be zero so as to make it possible to supply maximum power.

On the basis of the phase signals $S_3$, the phase control circuit 10 generates control signals for turning on/off the respective transistors $Tr_1$ through $Tr_4$, and a control signal for controlling the phase difference $\alpha$ from turn-on of the transistor $Tr_1$ acting as the first switching element to turn-on of the transistor $Tr_4$ acting as the fourth switching element as well as the phase difference from turn-on of the transistor $Tr_2$ acting as the second switching element to turn on of the transistor $Tr_3$ acting as the third switching element.

Upon reception of the X-ray exposure signal $S_4$ applied from the controller (not shown), the phase control circuit 10 supplies the generated control signals to the driving circuits 11a through 111d, so that the driving circuits 11a through 11d drive the respective transistors $Tr_1$ through $Tr_4$ constituting the inverter 2 on the basis of the control signals supplied from the phase control circuit 10.

When the transistors $Tr_1$ through $Tr_4$ are started to operate as described above, the resonance current $i_r$ as shown in FIG. 3 or 4 flows in a transformer 3, and the tube voltage is begun to be applied to the X-ray tube acting as the load 5, so that the tube current flows. Thereafter, when the tube voltage applied to the X-ray tube approaches the set value, the error between the tube voltage set signal $S_1$ and the tube voltage detection signal $S_5$ becomes small, so that the error amplification phase determination circuit 15 operates to increase the phase difference $\alpha$ to thereby reduce the power supplied from a DC power source 1. When the tube voltage of the X-ray tube becomes substantially equal to the set value, the inverter 2 operates at such a phase that power equal to that corresponding to the set tube voltage and tube current can be supplied from DC power source 1 to the load 5. At this time, the inverter 2 is operated at a resonance frequency determined by the leakage inductance $L_S$ and the stray capacitance $C_S$ of the transformer 3 or at a frequency near the resonance frequency.

Figure 7:
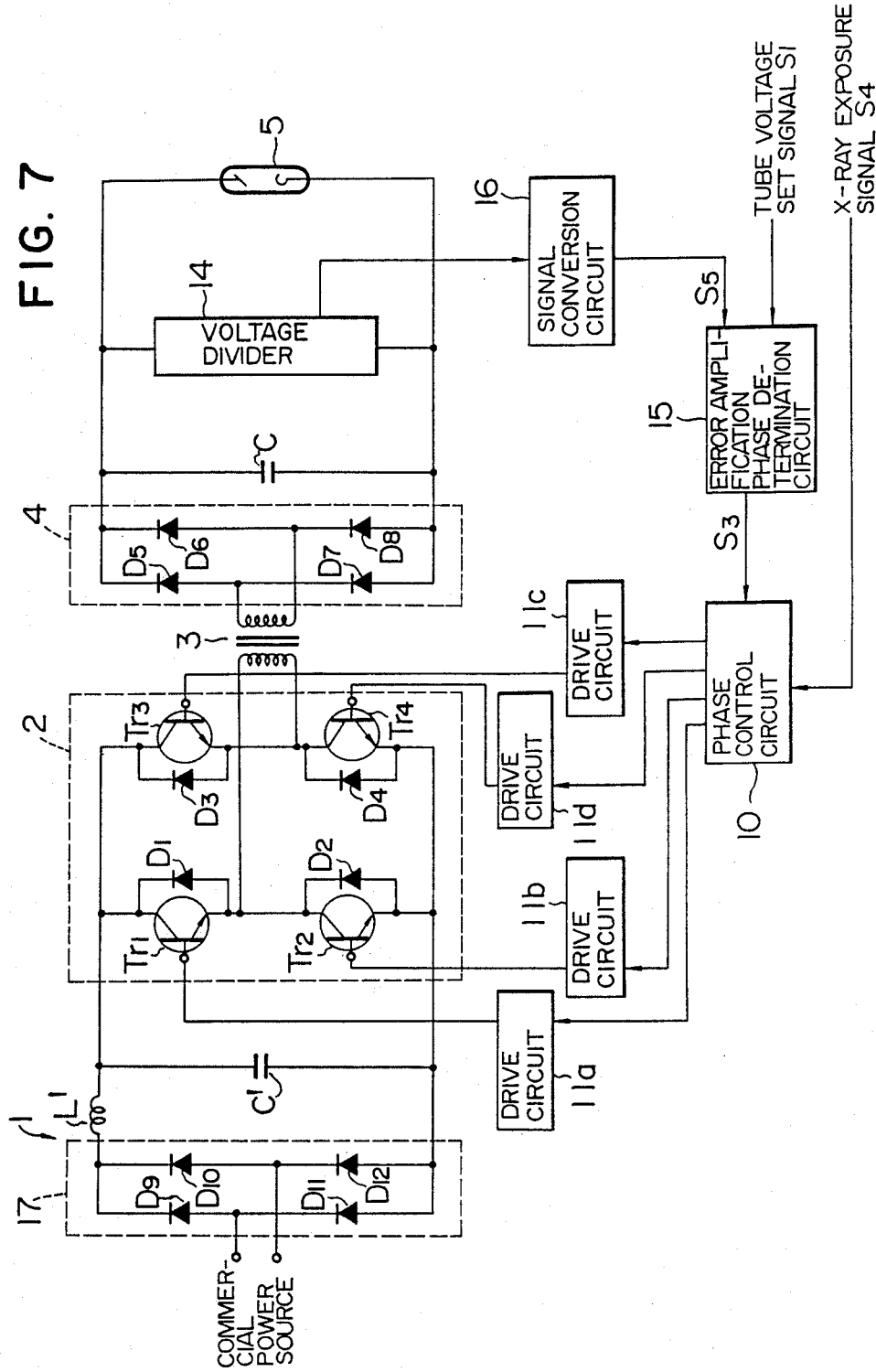
FIG. 7 a circuit diagram of another embodiment of the resonance DC-DC converter according to the second aspect of the invention.
Figure 8:
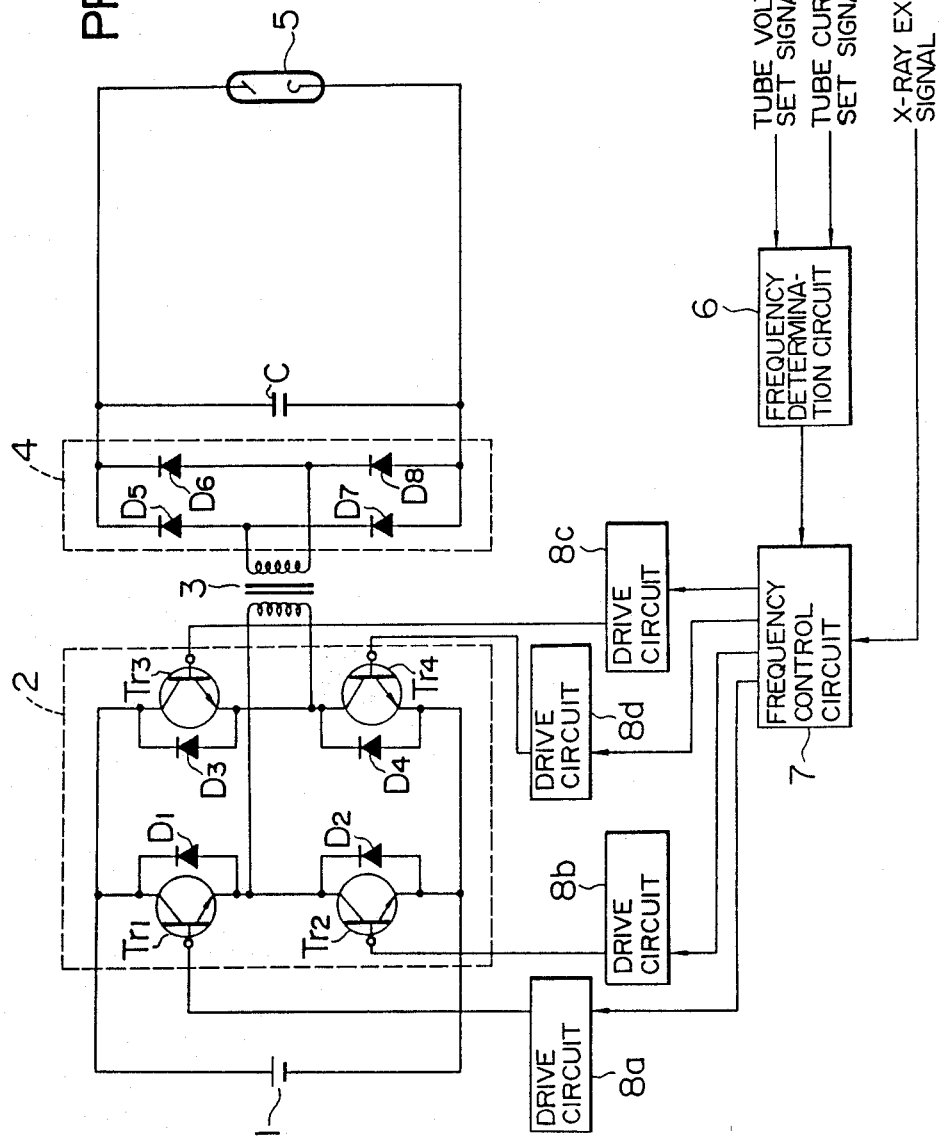
FIG. 8 is a circuit diagram showing a conventional resonance DC-DC converter.

FIG. 7 is a circuit diagram showing another embodiment according to the second aspect of the invention. In this embodiment, a DC power source 1 is obtained by AC power received from a commercial power source that is rectified and smoothed. A rectifier 17 is constituted by four diodes $D_9$ through $D_{12}$ so as to convert the AC power received from the commercial power source into DC power through full-wave rectification. Capacitance $C'$ and inductance $L'$ are provided to smooth the DC output of the rectifier 17. In this embodiment, output power can be increased in comparison with the foregoing embodiment of FIG. 6. For example, power of about several tens Kw - several hundreds Kw can be supplied to the load.

Although the transistors $Tr_1$ through $Tr_4$ are used as the switching elements of the inverter 2 in the foregoing embodiments of FIGS. 1, 6, and 7, the present invention is not limited to this, but, for example, GTOs may be used. Alternatively, for purpose of operation of the inverter 2 at a higher frequency, MOS FETs, IGBTs, SI transistors, SI thyristors, or the like may be used. Further, the load 5 is not limited only to the X-ray tube, but the invention may be applied to any load similarly to the X-ray tube so long as the load requires a DC output power of a relatively high voltage. Although processing is generally performed through the proportional-plus-integral control in the error amplification phase determination circuit 15 of FIGS. 6 and 7, the present invention is not limited to this, but the processing may be carried out through control using software by using various data to be used in the processing after converted into digital values.

As described above, according to the present invention, the output power of the inverter can be changed from zero to the maximum value through the phase control of the inverter 2, so that the range of output power control can be further extended in comparison with that provided by the prior art control system. Further, unlike the prior art system, the output power can be controlled without changing the operation frequency $F_i$ of the inverter 2, so that increase in sectional area of the iron core of the transformer 3 due to reduction in the operation frequency $F_i$ becomes unnecessary to thereby prevent the transformer 3 from being increased in size. Consequently, the whole apparatus can be reduced in size. In the case where the operation frequency $F_i$ of the inverter 2 with a rated load is selected to be higher than an audio frequency so as to reduce noises, it is possible to maintain the low noise state without changing the operation frequency $F_i$ in controlling the output voltage thereafter. Moreover, according to the second aspect of the invention, power to be supplied to the load 5 is controlled through feedback in such a manner that an actual voltage applied to the load 5 is detected and respective operation phases of the switching elements of the inverter 2 are determined on the basis of the error between the detection tube voltage signal and the target tube voltage signal, so that the output power can be controlled with higher accuracy.

What is claimed is:
1. A resonant DC-DC converter comprising:
a DC power source;
an inverter for receiving DC power from said DC source and for converting the DC power into AC power, said inverter having a first series connection of first and second switching elements respectively connected to a positive and a negative pole of said DC power source, a second series connection connected in parallel to said first series connection and composed of third and fourth switching elements disposed so as to respectively correspond to said first and second switching elements, and first, second, third and fourth diodes anti-parallelly connected to said first, second, third and fourth switching elements, respectively;
a transformer, including primary and secondary windings, connected to an output of said inverter for boosting an output voltage of said inverter;
a rectifier for converting an AC output voltage of said transformer into a DC output voltage;
a load connected to said rectifier;
said transformer including a parasitic leakage inductance and stray capacitance existing among said primary or secondary windings of said transformer, said leakage inductance and said stray capacitance being used as resonance elements so that a resonance voltage induced at said stray capacitance by the resonance between said leakage inductance and said stray capacitance and a transformation ratio is applied to said rectifier;
means for smoothing the DC output voltage of said rectifier and for applying the smoothed DC output voltage to said load;
a phase determination circuit for determining respective operation phases of said first, second, third and fourth switching elements of said inverter and substantially over the entire range of operation of said inverter in accordance with set signals indicating a voltage and a current to be supplied to said load;
a phase control circuit for controlling the respective operation phases of said first, second, third and fourth switching elements on the basis of an output signal of said phase determination circuit in a manner so that said first and second switching elements are alternately turned on with a phase difference of 180 degrees with respect to an operation frequency of said inverter, said third and fourth switching elements are alternately turned on with a phase difference of 180 degrees with respect to the operation frequency of said inverter, while varying a phase difference from a point in time of turn-on of said first switching element to a point in time of turn-on of said fourth switching element and a phase difference from a point in time of turn-on of said second switching element to a point in time of turn-on of said third switching element to thereby control the power supplied to said load in accordance with the phase determination made by said phase determination circuit.

2. A resonance DC-DC converter according to claim 1, in which said smoothing means is an electrostatic of a high tension cable for applying said DC output voltage to said load.

3. A resonant DC-DC converter according to claim 1, in which said load is an X-ray tube.

4. A resonant DC-DC converter according to claim 2, in which said load is an X-ray tube.

5. A resonant DC-DC converter comprising:
a DC power source;
an inverter for receiving DC power from said DC source and for converting the DC power into AC power, said inverter having a first series connection of first and second switching elements respectively connected to a positive and a negative pole of said DC power source, a second series connection connected in parallel to said first series connection and composed of third and fourth switching elements disposed so as to respectively correspond to said first and second switching elements, and first, second, third and fourth diodes anti-parallelly connected to said first, second, third and fourth switching elements, respectively;
a transformer, including primary and secondary windings, connected to an output of said inverter for boosting an output voltage of said inverter;

a rectifier for converting an AC output voltage of said transformer into a DC output voltage;

a load connected to said rectifier;

said transformer including a parasitic leakage inductance and stray capacitance existing amoung said primary or secondary windings of said transformer, said leakage inductance and said stray capacitance being used as resonance elements so that a resonance voltage induced at said stray capacitance by the resonance between said leakage inductance and said stray capacitance and a transformation ratio is applied to said rectifier;

means for smoothing the DC output voltage of said rectifier and for applying the smoothed DC output voltage to said load;

a voltage divider for detecting the voltage applied to said load;

an error amplification phase determination circuit for receiving a detection signal from said voltage divider and an externally applied preset target voltage signal so as to amplify a difference between said detection signal and said target voltage signal, and for determining respective operation phases of said first, second, third and fourth switching elements of said inverter substantially over the entire range of operation of said inverter, on the basis of said amplified difference; and a phase control circuit for controlling the respective operation phases of said first, second, third and fourth switching elements on the basis of an output signal of said error amplification phase determination circuit in a manner so that said first and second switching elements are alternately turned on with a phase difference of 180 degrees with respect to an operation frequency of said inverter, said third and fourth switching elements are alternately turned on with a phase difference of 180 degrees with respect to the operation frequency of said inverter, while varying a phase difference from a point in time of turn-on of said first switching element to a point in time of turn-on of said fourth switching element and a phase difference from a point in time of turn-on of said second switching element to a point in time of turn-on of said third switching element to thereby effect feed-back control of power supplied to said load in accordance with the phase determination made by said error amplification phase determination circuit.

6. A resonant DC-DC converter according to claim 5, in which said smoothing means is an electrostatic capacitance of a high tension cable for applying said DC output voltage to said load.

7. A resonant DC-DC converter according to claim 5, wherein said DC power source is obtained from AC power received from a commercial power source, rectified into a DC power and then smoothed.

8. A resonant DC-DC converter according to claim 6, wherein said DC power source is obtained from AC power received from a commercial power source, rectified into a DC power and then smoothed.

9. An X-ray generating apparatus having a resonant DC-DC converter comprising:

a DC power source;

an inverter for receiving DC power from said DC source and for converting the DC power into AC power, said inverter having a first series connection of first and second switching elements respectively connected to a positive and a negative pole of said DC power source, a wecond series connection connected in parallel to said first series connection and composed of third and fourth switching elements disposed so as to respectively correspond to said first and second switching elements, and first, second, third and fourth diodes anti-parallelly connected to said first, second, third and fourth switching elements, respectively;

a transformer, including primary and second windings, connected to an output of said inverter for boosting an output voltage of said inverter;

a rectifier for converting an AC output voltage of said transformer into a DC output voltage;

an X-ray tube applied with a smoothed output voltage of said rectifier via a high tension cable;

said transformer including a parasitic leakage inductance and stray capacitance existing among said primary or secondary windings of said transformer, said leakage inductance and said stray capacitance being used as resonance elements so that a resonance voltage induced at said stray capacitance by the resonance between said leakage inductance and said stray capacitance and a transformation ratio is applied to said rectifier;

a voltage divider for detecting the voltage applied to said X-ray tube;

an error amplification phase determination circuit for receiving a detection signal from said voltage divider and an externally applied preset target voltage signal so as to amplify a difference between said detection signal and said target voltage signal, and for determining respective operation phases of said first, second, third and fourth switching elements of said inverter substantially over the entire range of operation of said inverter, on the basis of said amplified difference; and a phase control circuit for controlling the respective operation phases of said first, second, third and fourth switching elements on the basis of an output signal of said error amplification phase determination circuit in a manner so that said first and second switching elements are alternately turned on with a phase difference of 180 degrees with respect to an operation frequency of said inverter, said third and fourth switching elements are alternately turned on with a phase difference of 180 degrees with respect to the operation frequency of said inverter, while varying a phase difference from a point in time of turn-on of said first switching element to a point in time of turn-on of said fourth switching element and a phase difference from a point in time of turn-on of said second switching element to a point in time of turn-on of said third switching element to thereby effect in feed-back control of power supplied to said X-ray tube in accordance with the phase determination made by said error amplification phase determination circuit.

10. A resonant DC-DC converter according to claim 9, wherein said DC power source is obtained from AC power received from a commercial power source, rectified into a DC power and then smoothed.

* * * * *